Patented June 30, 1953 2,643,966

UNITED STATES PATENT OFFICE 2,643,966

VESICANT COMPOSITION FOR AND METHOD OF RENDERING WATER HAZARDOUS

James Edward Mills, Edgewood, Md., assignor to the United States of America as represented by the Secretary of War No Drawing. Application January 16, 1925, Serial No. 3,111

19 Claims. (Cl. 167—47)

(Granted under Title 35, U. S. Code (1952), sec. 266)

1

The invention described herein may be used by the Government or any of its officers or employees in prosecution of work for the Government, without payment of any royalty thereon.

This invention relates to a method and means for rendering a body of water hazardous for passage therethru and thereon.

Among the objects of this invention is to provide a composition and process whereby the surface of a body of water, such as a river, stream, etc. may be covered or coated in whole or in part with a toxic material to make hazardous the fording of such streams.

A further object of this invention is to provide a composition which may be distributed upon the surface of water in harbors and docks to render the passage thru the water or entrance of small boats in such harbors or docks hazardous to persons upon such boats.

A more specific object of this invention is to provide a composition and process whereby the landing of naval parties is made dangerous and difficult and which will subject persons attempting such landing to the influence of a toxic material, thus exposing such persons to influences which will produce fatalities or other casualties.

This invention has special application for use in warfare and where it is desired to effect a blockade against entrance of persons transported over or thru bodies of water. This invention lends itself as effective means for offensive and defensive uses in warfare.

In carrying out my invention I prepare a composition containing a toxic vesicant substance, such as mustard gas (Bis B chlorethyl sulphide), and a suitable vehicle, such as an oil, the composition having a specific gravity lower than that of water so as to float thereon. This composition is then distributed over the surface of rivers, harbors, docks or other bodies of water.

The oil entering into this composition may either dissolve the vesicant agent or else form therewith some other persistent dispersion, such as an emulsion or substantially permanent suspension.

I have found the following characteristics most important in an oil for use with a vesicant substance if the most efficient results are to be obtained.

1. The specific gravity should be sufficiently below that of water so that when the vesicant substance is added to the oil the resulting composition will float upon the water.

2. The oil should have a boiling point sufficiently high so that no extensive evaporation will take place when the mixture is placed upon the water for otherwise, as the oil evaporates, the vesicant substance will become heavier and finally sink below the surface of the water.

2

3. The viscosity of the oil even at the lowest temperature that may be encountered, that is, at or about the freezing point of water, should be such that the mixture will be mobile enough to move freely on the surface of the water.

4. The oil should adhere easily and readily to dry or wetted surfaces, such as the sides of landing boats or the bodies of men or animals.

5. The oil should spread evenly over the surface of water instead of forming large pools, and when admixed with such a vesicant substance as mustard gas, should retard the normal rate of hydrolysis of the mustard gas as much as possible.

I have found that the most effective and satisfactory oil for this purpose and which more closely satisfies the requirements of an ideal oil is castor-oil. The mineral oils when mixed with a vesicant substance such as mustard gas and distributed on water produce a thin film or layer, substantially continuous, which presents as exceedingly great surface of mustard gas to the hydrolytic action of the water. These mineral oils, however, can advantageously be used where the air and water is warm, or if a concentrated solution of the mustard gas is used or if it is desired to produce a toxic area or zone for a short period which will be safe to pass through after one or two days. The animal oils as a class, when mixed with mustard gas distributed on water produce tiny globules or substantially small pools, wherein the mustard gas is so protected as to hydrolyze very much slower.

A specific example of my invention is as follows: A 10% solution of mustard gas in castor-oil is prepared and distributed over the surface of water in small pools. When the water is agitated, the vesicant mixture breaks up into minute globules and effectively spreads over a large surface. After a lapse of several days there is still enough mustard gas present to produce burns on animals when they are passed thru the water. This mixture, even at 0° C., retains its mobility and accommodates itself to the movement of the water. When a metal or wood object is passed thru the water, the mustard gas-castor oil mixture adheres to it and can be removed by running water only with difficulty.

The mixture of vesicant and oil can be distributed over the surface of the water by planes or vessels or by the use of artillery or Stokes mortar shells or aviation bombs or by other methods found desirable. I have found that six tons of mustard gas used as a 10% solution in castor-oil will distribute itself over a square mile of water so as to make it practically impossible for man or animal to enter the water without coming in contact with the vesicant substance. A much smaller quantity of mustard gas will suffice to render passage over or thru the water dangerous since a continuous distribution of the vesicant mixture is not necessary for this purpose.

In carrying out this invention other vesicant agents may be used instead of the mustard gas such as mustard sulphone and phenyldichlor arsine, and also other oils substituted for the castor-oil. Kerosene, xylene, lubricating oils and crude mineral oil may be used and also certain other vegetable oils, such as cotton-seed oil and some animal oils may also be employed.

The materials herein specified give off toxic gases and vapors and are also vesicants. It will be appreciated that some substances may be incorporated into the oil vehicle which are toxic only or are vesicant only. Such a toxic substance would be protected by the oil from the water and from the air as long as the surface of the water was not disturbed, but when the oil film becomes broken by the passage of a boat or other means, the toxic gas and vapors will be given off.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a composition for rendering a body of water hazardous for passage therethru, a dispersion of a vesicant material in an oil, said material being capable of dispersing in gaseous condition to provide a gaseous layer overlying the body of water.

2. In a composition for rendering a body of water hazardous for passage therethru, a dispersion of a vesicant material in an oil, said material being capable of dispersing in gaseous condition to provide a gaseous layer overlying the body of water, and said oil having the property of readily adhering to the sides of both dry and wetted solid surfaces.

3. In a composition for rendering a body of water hazardous for passage therethru, a dispersion of a vesicant material in a vegetable oil, said material being capable of dispersing in gaseous condition to provide a gaseous layer overlying the body of water, and said vegetable oil having a boiling point considerably higher than water, a low viscosity at 0° C., the property of readily adhering to the sides of both dry and wetted solid surfaces and having high surface tension.

4. In a composition for rendering a body of water hazardous for passage therethru, a dispersion of a vesicant material in castor-oil, said material being capable of dispersing in gaseous condition to provide a gaseous layer overlying the body of water.

5. In a composition for rendering a body of water hazardous for passage therethru, a dispersion of mustard gas in a vehicle, said composition being lighter than water.

6. In a composition for rendering a body of water hazardous for passage therethru, a dispersion of mustard gas in a vehicle, said composition being lighter than water, and having a low viscosity at 0° C. and the property of readily adhering to the sides of both dry and wetted solid surfaces.

7. In a composition for rendering a body of water hazardous for passage therethru, a dispersion of mustard gas in an oil, said composition being lighter than water, and said oil having a boiling point considerably higher than water and the property of readily adhering to the sides of both dry and wetted solid surfaces.

8. In a composition for rendering a body of water hazardous for passage therethru, a dispersion of mustard gas in a vegetable oil, said composition being lighter than water, and said vegetable oil having a boiling point considerably higher than water, a low viscosity at 0° C., the property of readily adhering to the sides of both dry and wetted solid surfaces and having high surface tension.

9. In a composition for rendering a body of water hazardous for passage therethru, a dispersion of mustard gas in castor-oil.

10. In a process of rendering a body of water hazardous for passage therethru, placing on said surface a vesicant material, said material being capable of dispersing in gaseous condition to provide a gaseous layer overlying the body of water.

11. In a process of rendering a body of water hazardous for passage therethru, placing on said surface a dispersion of a vesicant material in a vehicle, said material being capable of dispersing in gaseous condition to provide a gaseous layer overlying the body of water.

12. In a process of rendering a body of water hazardous for passage therethru, placing on said surface a dispersion of a vesicant material in oil, said material being capable of dispersing in gaseous condition to provide a gaseous layer overlying the body of water.

13. In a process of rendering a body of water hazardous for passage therethru, placing on said surface a dispersion of a vesicant material in a vegetable oil, said material being capable of dispersing in gaseous condition to provide a gaseous layer overlying the body of water, and said vegetable oil having the property of readily adhering to the sides of both dry and wetted solid surfaces.

14. In a process of rendering a body of water hazardous for passage therethru, placing on said surface a dispersion of a vesicant material in castor-oil, said material being capable of dispersing in gaseous condition to provide a gaseous layer overlying the body of water.

15. In a process of rendering a body of water hazardous for passage therethru, placing on said surface a dispersion of mustard gas in a vehicle, said composition being lighter than water.

16. In a process of rendering a body of water hazardous for passage therethru, placing on said surface a dispersion of mustard gas in a vehicle, said composition being lighter than water, and said vehicle having a boiling point considerably higher than water, the property of readily adhering to the sides of both dry and wetted solid surfaces and having high surface tension.

17. In a process of rendering a body of water hazardous for passage therethru, placing on said surface a dispersion of mustard gas in an oil, said composition being lighter than water, and said oil having a low viscosity at 0° C. and the property of readily adhering to the sides of both dry and wetted solid surfaces.

18. In a process of rendering a body of water hazardous for passage therethru, placing on said surface a dispersion of mustard gas in a vegetable oil, said composition being lighter than water, and said vegetable oil having a boiling point considerably higher than water, a low viscosity at 0° C., the property of readily adhering to the sides of both dry and wetted solid surfaces and having high surface tension.

19. In a process of rendering a body of water hazardous for passage therethru, placing on said surface a dispersion of mustard gas in castor-oil.

JAMES EDWARD MILLS.

References Cited in the file of this patent

The Universal Formulary, Griffith, 1854; copy in Division 70.